July 25, 1961  J. M. LADD  2,993,474
FLUID PRESSURE ACTUATED CONTROL MECHANISM
Filed March 26, 1956  2 Sheets-Sheet 1
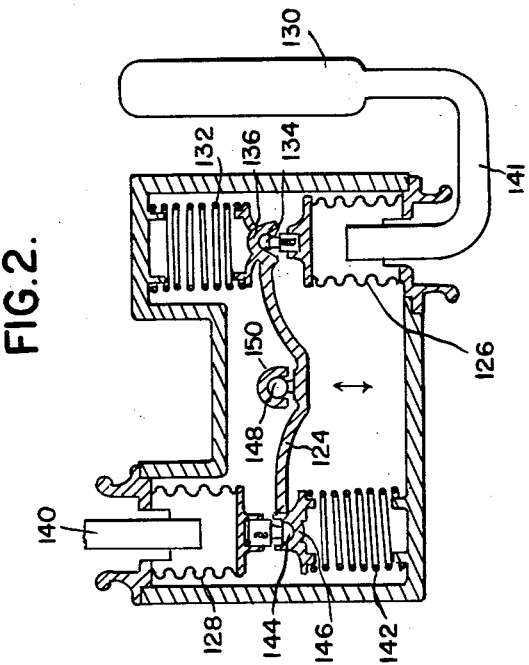
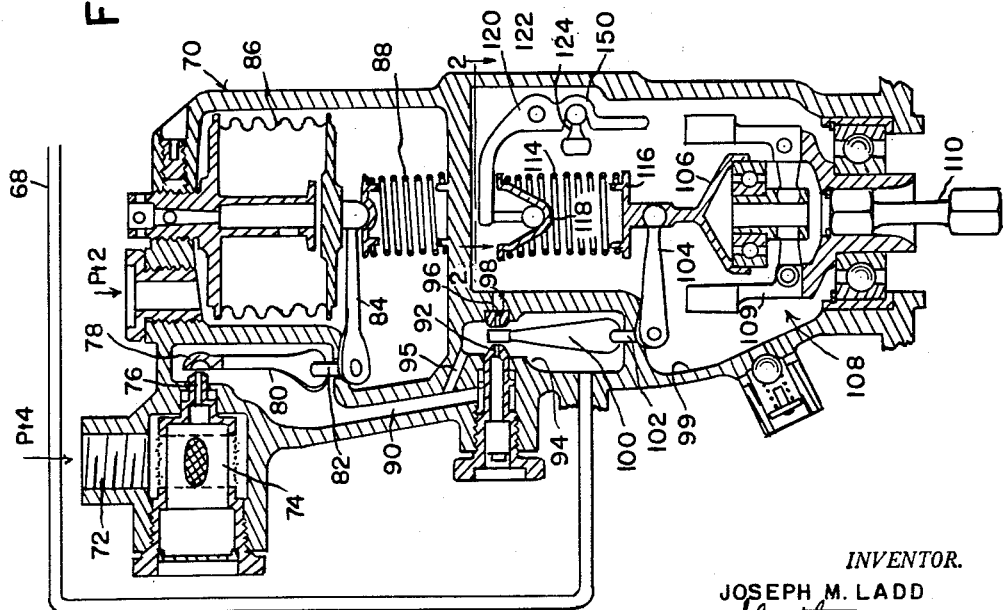
INVENTOR.
JOSEPH M. LADD
BY Whittemore,
Hulbert & Belknap
ATTORNEYS July 25, 1961  J. M. LADD  2,993,474
FLUID PRESSURE ACTUATED CONTROL MECHANISM
Filed March 26, 1956  2 Sheets-Sheet 2
FIG.IB.
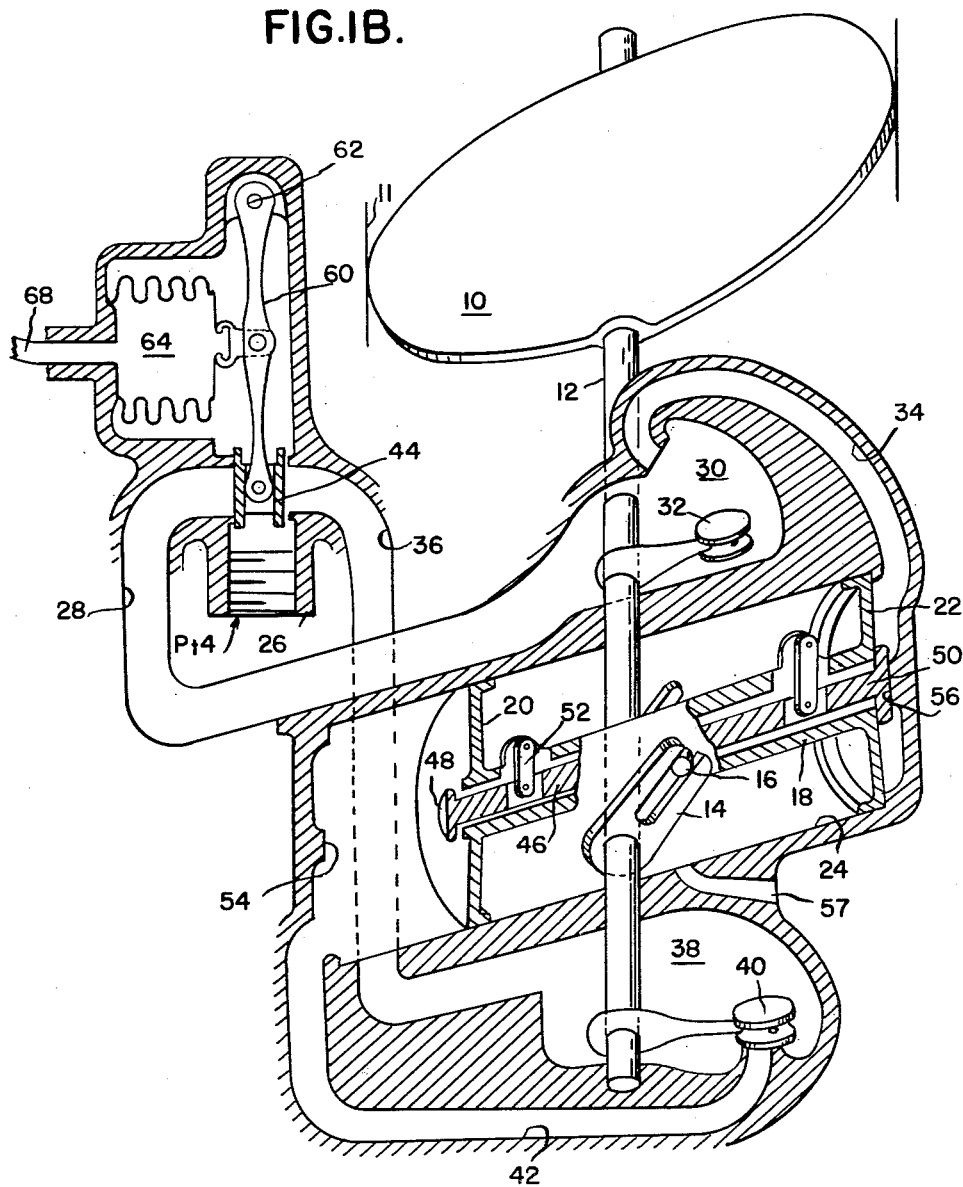
INVENTOR.
JOSEPH M. LADD
BY Whittemore,
Hulbert & Belknap
ATTORNEYS

2,993,474
FLUID PRESSURE ACTUATED CONTROL MECHANISM

Joseph M. Ladd, Hamtramck, Mich., assignor to Holley Carburetor Company, Van Dyke, Mich., a corporation of Michigan
Filed Mar. 26, 1956, Ser. No. 577,910
11 Claims. (Cl. 121—38)

The present invention relates to a bleed valve actuation, and more particularly to mechanism for actuating the compressor bleed valve in an engine such for example as a gas turbine.

It is an object of the present invention to provide a pneumatic-mechanical system having snap action on the bleed valves under the control of engine rotative speed, compressor inlet temperature and compressor inlet pressure.

It is a further object of the present invention to provide mechanism of the character described which employs compressor discharge pressure both as a pressure signal in the system and as a source of power for operating the valve actuator.

It is a further object of the present invention to provide bleed valve actuated mechanism comprising altitude lock-out means to prevent opening of the bleed valve below a predetermined altitude.

It is a further object of the present invention to provide bleed valve actuating mechanism comprising a motor for operating the bleed valve, pressure responsive means for controlling the motor, valve means for controlling fluid pressure applied to said pressure responsive means, a centrifugal governor for operating said valve, said governor including a governor spring, and means responsive to compressor inlet temperature for effecting adjustment of the governor spring.

It is a further object of the present invention to provide a bleed valve actuating mechanism as described in which all valves are poppet valves.

It is a further object of the present invention to provide a bleed valve actuating mechanism in which the bleed valve is moved quickly to either fully open or fully closed position.

Other objects and features of the invention will become apparent as the description proceeds, especially when taken in conjunction with the accompanying drawing, wherein:

FIGURE 1 is a diagrammatic view separated into two parts 1A and 1B, of the bleed valve control mechanism.

FIGURE 2 is a diagrammatic view taken in the direction of the arrows 2—2, FIGURE 1A.

The present invention relates to mechanism for effecting an adjustment of a bleed valve 10 located in a bleed passage 11 which connects to the compressor of an internal combustion engine such for example as a gas turbine. It is a function of the mechanism to actuate the compressor bleed valve or valves in such a manner as to avoid compressor stall under all engine operating conditions. In order to accomplish this there is provided a pneumatic-mechanical system that provides snap action on the bleed valves as a function of engine rotative speed, compressor inlet temperature, and compressor inlet pressure. The engine compressor discharge pressure is used as a pressure signal from the governor to the two actuators as well as the source of power to operate them.

As seen in FIGURE 1, the bleed valve 10 is provided in a bleed passage 11 connected to the interior of an air compressor. The valve is illustrated in closed position to maintain the pressure within the compressor at a relatively high valve. The bleed valve is operated by a shaft 12 having a slotted arm 14 receiving a pin 16 carried by a tubular portion 18 interconnecting piston heads 20 and 22. The piston heads 20 and 22 are slidable in a cylinder 24 under the control of mechanism later to be described, and are adapted to shift the bleed valve 10 from the fully closed position shown in FIGURE 1 to a position in which it is fully open. The mechanism does not provide for regulation of the bleed valve. The bleed valve will thus normally occupy either the fully closed or fully open position and hence, the action is referred to as snap action.

A source of fluid under pressure, such for example as air under compressor discharge pressure $P_t4$, is supplied to the valve actuating mechanism at a connection 26. From this connection the fluid under pressure may pass through the passage 28 to a chamber 30 in which is located a valve 32 and when the valve 32 is open thence through a passage 34 to the right hand end of the cylinder 24, as seen in FIGURE 1. Alternatively, the fluid under pressure may pass through a passage 36 to a chamber 38 in which is located a valve 40 and when the valve is open thence through a passage 42 to the left hand end of the cylinder 24. The ports to the passages 28 and 36 are controlled by a valve 44.

Longitudinally movable in an opening through the tubular portion 18 connecting the piston heads 20 and 22 is a poppet valve 46 having valve heads 48 and 50. As illustrated, the valve member 46 is suspended from links 52 for freedom of movement. The ends of the cylinder 24 are provided with valve actuating abutments 54 and 56. With the parts in the position illustrated, it will be observed that the valve head 50 closes the entrance to the interior of the tubular portion 18 of the piston. The cylinder intermediate its ends is provided with a vent 57 permitting fluid under pressure which passes one of the poppet valve heads 48 or 50 to exhaust to atmosphere.

With the parts in the position illustrated in FIGURE 1, fluid under pressure is admitted through the passage 36 to the chamber 38 but valve 40 is closed and pressure is therefore cut off from the left hand end of the cylinder 24. If now, the valve 44 is shifted to the right, fluid under pressure is admitted through the passage 28, chamber 30, past the valve 32 through the chamber 34 to the right hand end of the cylinder 24. At this time the valve head 50 of the poppet valve is closed and the fluid under pressure accordingly shifts the piston to the left hand end of the cylinder 24. This is accompanied by rotation of the shaft 12, opening movement of the valve 40, and closing movement of the valve 32. Just as the piston reaches the left hand end of the cylinder, the valve 32 closes and the final travel of the piston closes poppet valve head 48 and opens valve head 50.

Thus, fluid under pressure is cut off from the passage 34 and any pressure within the cylinder to the right of the piston is vented past the valve head 50.

In order to control the position of the selector valve 44 which determines whether the bleed valve 10 is in fully open or fully closed position, the valve 44 is mounted on a lever 60 pivoted as indicated at 62 and connected to a bellows 64. The interior of the bellows is connected by a passage 68 to the control mechanism illustrated in FIGURE 1A. The exterior of the bellows 64 is subjected to discharge pressure $P_t4$ of the compressor. If pressure through the line 68 equals discharge pressure, then fluid pressures acting on the bellows 64 are balanced and the resilience of the bellows operates to shift the valve 44 to the right. If however, pressure through the passage 68 is maintained at a lower percentage of discharge pressure, then discharge pressure acting on the exterior of the bellows maintains it partly compressed and holds the valve 44 to the left, as seen in FIGURE 1.

Reference is now made to the control mechanism shown diagrammatically at the left of FIGURE 1. The control mechanism comprises a casting indicated generally at 70 having a threaded opening 72 for connection to a source of fluid under compressor discharge pressure $P_t4$. An air filter 74 is provided and air passing through the filter reaches port 76 where its passage is controlled by an altitude lock-out valve 78. The valve 78 is carried at the end of an arm 80 connected to a shaft 82 which carries a second arm 84, the free end of the arm being engaged between an evacuated bellows 86 and a compression spring 88. The exterior of the bellows 86 is subjected to ambient pressure which depends upon the altitude. The spring and bellows constants are so selected that the valve 78 remains closed below a predetermined altitude setting.

When the predetermined altitude is reached the valve 78 opens and fluid under the compressor discharge pressure $P_t4$ passes through a passage 90 to a port 92 located within a chamber 94. A restricted passage 95 is provided which connects the chamber 94 to the passage 90. This prevents pressure within the chamber 94 from falling beyond a fixed percent of inlet pressure $P_t4$, so long as the altitude lock-out valve 78 is open. The function of the restricted passageway 95 is to supply that amount of air which is lost through the rotary seal on shaft 102. This is needed in order to have the pressure in line 68 equal compressor pressure $P_t4$ at the bellows 64. Located within the chamber 94 and in facing relation to the port 92 is a port 96 provided in a passage 98 extending to an open portion 99 of the casing where ambient pressure $P_t2$ exists. Movable back and forth between the ports 92 and 96 is a valve 100 carried by a pivot shaft 102 to which is connected an arm 104. The free end of the arm 104 is connected to a movable member 106 of a centrifugal governor indicated generally at 108, the member 106 being movable upwardly upon an increase in speed of the rotating part 109 of the centrifugal governor. Drive coupling means is indicated at 110.

The centrifugal governor includes an adjustable governor spring 114 one end of which is seated on a spring seat 116 connected to the member 106. The opposite end of the spring is engaged upon an adjustable spring seat 118 which is associated with an adjusting lever 120 pivoted as indicated at 122 and associated with an arm 124, best seen in FIGURE 2.

Located in the housing are a pair of bellows 126 and 128. The interior of the bellows 126 communicates with a fluid filled bulb 130 through a line 141, the bulb being exposed to the inlet of the compressor of the engine so as to provide a temperature response in accordance with the inlet air to the engine. Opposing the bellows 126 is a compression spring 132. The head of the bellows is provided with a ball portion 134 receivable in a socket 136 of a balancing or integrating arm 124. Associated with the bellows 128 is a closed line 140 having a volume equal to the line 141 and positioned to be exposed to the same ambient temperature as the line 141. The changes in control temperature to which bellows 126 and 128 and lines 140 and 141 are exposed, effect the lengths of both bellows 126 and 128 the same since the volume of bellows 126 and line 141 is the same as bellows 128 plus line 140. Therefore the relative change in length of bellows 126 is due substantially solely to the temperature of the bulb 130. The bellows 128 is opposed by a spring 142 and the head of the bellows carries a ball portion 144 received in a socket portion 146 of the arm 124.

Intermediate its ends the arm 124 carries a ball 148 received in a socket 150 on the lever 120.

The arm 124 is thus not provided with a stationary or fixed axis but instead, assumes positions as determined by the condition of expansion of the bellows 126 and 128. Thus for example, if the bellows 126 and 128 should expand equally from the position shown in FIGURE 2, due to equal expansion of fluid in bellows 126 and 128 and lines 140 and 141, arm 124 will merely rock about the center of the ball 148. On the other hand, if bellows 126 expands in response to an increase more than bellows 128 in bulb 130 temperature while fluid in bellows 128 and 126 and lines 140 and 141 contracts in response to a decrease in control operating temperature, arm 124 will move bodily to the right as seen in FIGURE 1A, thus producing counterclockwise rotation of the lever 120 and increasing compression of the governor spring 114.

It is believed the operation of the mechanism will be apparent from the foregoing description but for clarity the following description of operation is presented.

When the engine is started at sea level and ambient temperature is at a relatively low value the valve 78 is closed. The engine is cold and the setting of the governor spring is at a value determined by a combination of engine temperature and ambient temperature. As the engine is started and operates at a low speed centrifugal force developed by the rotating portion 109 of the governor develops forces tending to rotate lever arms 104 and 108 counterclockwise and thus tending to shift the valve 100 to the left to close the port 92 and to open the port 96. During this phase of operation air under the relatively high pressure $P_t4$ passes through the restricted passage 95 into the chamber 94 and through the jet 96 to atmosphere, thus maintaining pressure within this chamber at a percentage of $P_t4$ but less than sufficient to effect operation of the fluid motor. Accordingly, at this time arm 60 is in the illustrated position closing the port to the passage 28 and admitting fluid under the pressure $P_t4$ to the passage 36 which holds the valve 40 on its seat and accordingly holds the shaft 12 and bleed valve 10 in closed position.

Changes in operating conditions such as engine temperature, engine speed, and ambient temperature are ineffective to shift the bleed valve from the closed position so long as ambient pressure is at a value sufficiently great to hold the altitude lock-out valve in the closed position illustrated in FIGURE 1.

As soon as an altitude is reached sufficient to cause the ambient pressure as effective within the chamber containing the evacuated bellows 86 to fall to a value sufficient to permit opening of the valve 78, fluid under compressor outlet pressure $P_t4$ passes to the port 92. If at this time the valve 100 is in closing relation to the valve port 96, pressure within the chamber 94 quickly builds up to a value sufficient to actuate the bellows 64 and to shift the valve 44 to the right to close the port of the passage 36. This permits the fluid under compressor exhaust pressure $P_t4$ to pass through the passage 28 into the chamber 30, through the passage 34 and into the right hand end of the cylinder 24. At this time the poppet valve 50 is closed and this pressure is effective to shift the piston structure to the left, thus effecting rotation of the shaft 12 and movement of the bleed valve 10 from the closed position illustrated to its fully open position. When the valve 10 reaches its fully open position the piston construction will have reached the left hand end of the cylinder and the poppet valve 48 will be closed. This closure of poppet valve 48 opens poppet valve 50 so that the pressure as admitted through the passage 34 at this time can escape through the slots mounting links 52 into the cylinder and thence through the outlet passage 57 from the cylinder. Just as the piston reaches its left hand position, the valve 30 reaches its closed position and prevents further flow of fluid under pressure therepast. With the parts in the position just described it will be appreciated that the actuating structure is conditioned for subsequent movement to the right when control valve 44 again shifts to the position illustrated in FIGURE 2.

If when the altitude lock-out valve 78 opens, the valve 100 is to the left in position to close the port 92 and to leave the port 96 open, it will be appreciated that the fluid pressure within the chamber 94 will not rise to a value sufficient to operate the control valve 44. Since the passage 95 is restricted the pressure entering the chamber 94 will exhaust through the passage 98 until the valve 100 both opens the inlet port 92 and starts to close the outlet port 96. It will further be understood that as the valve 100 approaches outlet port 96 pressure will build up rapidly in chamber 94 and the valve 100 will move quickly to fully closed position. In other words, the operation is one in which the bleed valve is shifted quite rapidly from fully open to fully closed position and vice-versa, and will not enter into operating conditions by regulation.

It will further be appreciated that the operation may be considered as basically speed responsive, but subject to a control or regulation of speed at which the bleed valve is shifted between open and closed position which is a function of the compressor inlet air temperature. This control is desirable because the stall conditions of the engine which are avoided by the present mechanism are basically determined by engine speed and inlet air temperature.

The drawings and the foregoing specification constitute a description of the impoved bleed valve actuation in such full, clear, concise and exact terms as to enable any person skilled in the art to practice the invention, the scope of which is indicated by the appended claims.

What I claim as my invention is:

1. A fluid pressure operated motor for moving a member to either of two limiting positions and holding it in such position, said motor comprising a cylinder, piston means movable in said cylinder, said piston having a vented tube extending longitudinally therethrough open at opposite ends thereof into said cylinder, a rod extending through said tube having valve heads at opposite ends adapted to close either but not both of the open ends thereof, abutments at the ends of said cylinder engageable with the valve heads to close the end of the tube when the corresponding end of the piston reaches the end of the cylinder, a source of fluid under pressure, passages extending to opposite ends of said cylinder, a condition responsive control valve operable to connect said source to either of said passages, an additional valve in each of said passages mechanically connected to said piston means and operable to cut off pressure to the following end of the piston means at the end of the stroke.

2. A fluid pressure operated motor for moving a member to either of two limiting positions and holding it in such position, said motor comprising a cylinder, piston means movable in said cylinder, said piston having a vented tube extending longitudinally therethrough open at opposite ends thereof into said cylinder, a rod extending through said tube having valve heads at opposite ends adapted to close either but not both of the open ends thereof, abutments at the ends of said cylinder engageable with the valve heads to close the end of the tube when the corresponding end of the piston reaches the end of the cylinder, a source of fluid under pressure, passages extending to opposite ends of said cylinder, a condition responsive control valve operable to connect said source to either of said passages, an additional valve in each of said passages mechanically connected to said piston means and operable to cut off pressure to the following end of the piston means at the end of the stroke, said last mentioned valves being subjected when closed to the pressure of said source tending to hold them closed and to prevent movement of the member.

3. A motor comprising a pair of variable volume chambers, wall means movable to increase the volume of either chamber while decreasing the volume of the other, a fluid supply passage leading to the interior of each of said chambers, a source of fluid under pressure, a selector valve for admitting fluid from said source to one or the other of said passages, a shut-off valve in each of said passages intermediate said selector valve and said chambers actuated by movement of said wall means and operable to shut off flow of fluid to its associated chamber when the wall means has moved to a position corresponding to maximum volume of said associated chamber, a vent valve in each of said chambers, and means responsive to movement of said wall means for opening the vent valve in the chamber whose volume has been increased to its maximum while closing the vent valve in the chamber whose volume has been decreased to its minimum preparatory to a reverse movement of said wall means.

4. A motor comprising a pair of variable volume chambers, wall means movable to increase the volume of either chamber while decreasing the volume of the other, a fluid supply passage leading to the interior of each of said chambers, a source of fluid under pressure, a selector valve for admitting fluid from said source to one or the other of said passages, a shut-off valve in each of said passages actuated by movement of said wall means and operable to shut off flow of fluid to its associated chamber when the wall means has moved to a position corresponding to maximum volume of said associated chamber, a vent valve in each of said chambers, and means responsive to movement of said wall means for opening the vent valve in the chamber whose volume has been increased to its maximum while closing the vent valve in the chamber whose volume has been decreased to its minimum preparatory to a reverse movement of said wall means, said shut-off valves comprising valve seats and valve members movable downstream with the actuating fluid toward closed position so as to be held in closed position by fluid pressure when the associated vent valve is opened.

5. A motor comprising a pair of variable volume chambers, wall means movable to increase the volume of either chamber while decreasing the volume of the other, a fluid supply passage leading to the interior of each of said chambers, a source of fluid under pressure, a selector valve for admitting fluid from said source to one or the other of said passages, a shut-off valve in each of said passages mechanically connected to said wall means and actuated by movement of said wall means and operable to shut off flow of fluid to its associated chamber when the wall means has moved to a position corresponding to maximum volume of said associated chamber, a vent valve in each of said chambers, and means responsive to movement of said wall means for opening the vent valve in the chamber whose volume has been increased to its maximum while closing the vent valve in the chamber whose volume has been decreased to its minimum preparatory to a reverse movement of said wall means, said shut-off valves comprising valve seats and valve members movable downstream with the actuating fluid toward closed position so as to be held in closed position by fluid pressure when the associated vent valve is opened to establish forces tending to hold said wall means in either limiting position.

6. A motor for moving a member between limiting positions and retaining it in either limiting position comprising a cylinder, a pair of interconnected pistons in said cylinder, fluid passages connecting to opposite ends of said cylinder, a source of actuating fluid under pressure, a selector valve for admitting fluid to one or the other of said passages, a shut-off valve in each of said passages, means connecting said shut-off valves to said pistons for actuation thereby, vent valves in said pistons, means responsive to movement of said pistons for controlling movement of said vent valves, the vent valve of one piston being movable to open position upon completion of a stroke occasioned by fluid pressure on said one piston, said shut-off valves being movable downstream of the fluid which they control and movable to closed position upon completion of a piston stroke, so that opening of the associated vent valve creates a fluid pressure tending to hold said shut-off valve on its seat, and to thereby establish a force tending to hold said pistons at one end of their strokes until said selector valve is shifted to admit fluid to the other of said passages.

7. A motor for moving a member between limiting positions and retaining it in either limiting position comprising a cylinder, a pair of interconnected pistons in said cylinder, fluid passages connecting to opposite ends of said cylinder, a source of actuating fluid under pressure, a selector valve for admitting fluid to one or the other of said passages, a shut-off valve in each of said passages, means connecting said shut-off valves to said pistons for actuation thereby, said shut-off valves being movable downstream of the fluid which they control and movable to closed position upon completion of a piston stroke, so that closure of either of said shut-off valves creates a fluid pressure tending to hold said shut-off valve on its seat, and to thereby establish a force tending to hold said member in either limiting position until said selector valve is shifted to admit actuating fluid under pressure to the other of said passages.

8. A cylinder, a piston movable in said cylinder, a source of actuating fluid under pressure, fluid inlet passages connected between said source and opposite end portions of said cylinder, a selector valve for admitting fluid alternately to said inlet passages, a shut-off valve in each of said inlet passages, means connecting each of said shut-off valves to said piston for piston-actuated closure substantially at completion of a piston stroke in a direction resulting from admission of fluid pressure past such shut-off valve, exhaust passages connected to opposite end portions of said cylinder, an exhaust valve in each of said exhaust passages, and means connecting said exhaust valves to said piston for piston-actuated operation substantially at the end of each stroke.

9. Mechanism as defined in claim 8 in which means are connected to said piston to close the shut-off valve in the inlet passage leading to one end portion of the cylinder when the exhaust valve connected to such end portion is opened, to close the exhaust valve connected to the opposite end portion and to open the shut-off valve in the other inlet passage, to prepare the piston and cylinder for reverse movement when the selector valve is reversed.

10. A motor comprising a pair of variable volume chambers, wall means movable to increase the volume of one chamber while decreasing the volume of the other of said chambers, a fluid supply passage leading to the interior of each of said chambers, a source of fluid under pressure, a selector valve for admitting fluid from said source to one or the other of said passages, a shut-off valve in each of said passages intermediate said selector valve and said chambers, an exhaust passage including a vent valve connected to each of said chambers, and means responsive to movement of said wall means to a position in which one of said chambers has its maximum volume for closing the shut-off valve and opening the vent valve in the passages connected to said one chamber.

11. A motor comprising a pair of variable volume chambers, wall means movable to increase the volume of one chamber while decreasing the volume of the other of said chambers, a fluid supply passage leading to the interior of each of said chambers, a source of fluid under pressure, a selector valve for admitting fluid from said source to one or the other of said passages, a shut-off valve in each of said passages intermediate said selector valve and said chambers, and exhaust passage including a vent valve connected to each of said chambers, and means responsive to movement of said wall means to a position in which one of said chambers has its maximum volume for closing the shut-off valve and opening the vent valve in the passages connected to said one chamber and for substantially simultaneously closing the vent valve in the passage connected to the other of said chambers.

References Cited in the file of this patent

UNITED STATES PATENTS

| | | |
|---|---|---|
| 387,907 | Pendleton | Aug. 14, 1888 |
| 1,290,265 | McEntire | Jan. 7, 1919 |
| 1,410,911 | Gentzel | Mar. 28, 1922 |
| 1,557,427 | Conrader | Oct. 13, 1925 |
| 1,594,959 | Huff | Aug. 3, 1926 |
| 1,771,720 | Miller | July 29, 1930 |
| 1,893,462 | Wait | Jan. 3, 1933 |
| 2,361,870 | Rhoads et al. | Oct. 31, 1944 |
| 2,453,812 | Phelan | Nov. 16, 1948 |
| 2,467,434 | Kupiec | Apr. 19, 1949 |
| 2,515,029 | Almond et al. | July 11, 1950 |
| 2,642,848 | Walraven et al. | June 23, 1953 |
| 2,655,939 | Tauscher et al. | Oct. 20, 1953 |
| 2,709,420 | Fallwood | May 31, 1955 |
| 2,715,992 | Wilson | Aug. 23, 1955 |